(12) United States Patent
Dolan et al.

(10) Patent No.: US 8,675,855 B2
(45) Date of Patent: Mar. 18, 2014

(54) CALL AUTHORIZATIN FOR PAY-PER-CALL SERVICES

(75) Inventors: Stein E. Dolan, Redmond, WA (US); David Elkins, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1994 days.

(21) Appl. No.: 11/549,014

(22) Filed: Oct. 12, 2006

(65) Prior Publication Data

US 2008/0089500 A1    Apr. 17, 2008

(51) Int. Cl.
*H04M 3/42* (2006.01)

(52) U.S. Cl.
USPC .............................. 379/210.02; 379/265.01

(58) Field of Classification Search
USPC .................. 379/210.02, 249, 265.01–265.14, 379/266.01–266.1
See application file for complete search history.

(56) References Cited

U.S. PATENT DOCUMENTS

| | | | |
|---|---|---|---|
| 5,742,596 A | | 4/1998 | Baratz et al. |
| 5,898,770 A | * | 4/1999 | Valentine ..................... 379/249 |
| 5,953,393 A | | 9/1999 | Culbreth et al. |
| 6,459,697 B1 | | 10/2002 | Neyman |
| 6,594,269 B1 | | 7/2003 | Polcyn |
| 6,646,997 B1 | | 11/2003 | Baxley et al. |
| 7,315,518 B1 | * | 1/2008 | Siegrist ......................... 370/259 |
| 2002/0076025 A1 | | 6/2002 | Liversidge et al. |
| 2003/0112931 A1 | | 6/2003 | Brown et al. |
| 2003/0112943 A1 | | 6/2003 | Kamil |
| 2005/0063522 A1 | | 3/2005 | Kim et al. |
| 2005/0074107 A1 | | 4/2005 | Renner et al. |
| 2005/0074114 A1 | * | 4/2005 | Fotta et al. ............... 379/266.08 |
| 2005/0094794 A1 | | 5/2005 | Creamer et al. |
| 2005/0276406 A1 | | 12/2005 | Keohane et al. |

FOREIGN PATENT DOCUMENTS

WO    WO03003703    1/2003

OTHER PUBLICATIONS

"Configuring Cisco Voice Over IP," Jan. 31, 2006, pp. 1-312, Syngress Media, http://salaam.cs/buap.mx/EBOOKS/VoIP/Asterisk.
Singh, et al., "CINEMA: Columbia InterNet Extensible Multimedia Architecture," pp. 1-83, Columbia University Technical Report CUCS-011-02, NewYork, NY, May 2002, http://www1.cs.columbia.edu/~kns10/publication.
"Supporting of H.323 by IN," vol. 1, pp. 1-66, Jan. 2001, http://www.eurescom.de/Ipub/deliverables/documents/P900-series/P916/D3Vol1.

* cited by examiner

*Primary Examiner* — William Deane, Jr.
(74) *Attorney, Agent, or Firm* — Aaron Chatterjee; Peter Taylor; Micky Minhas

(57) ABSTRACT

A VoIP-enabled communications system includes IVR authentication for web initiated telephone calls. A web-based user initiates a telephone call by providing his telephone number and one or more target telephone numbers. In some embodiments, the target telephone number is identified by clicking on a call hyperlink. The system calls the user's telephone number and plays an IVR recording that asks the user to accept or reject the proposed connection to the target telephone number. If the user rejects, then he may be subject to being added to a Do Not Call list. If the user accepts, then the target number is called, and the connection bridged. Alternatively, if the user accepts, then the target number is called, and an IVR recording played. If the target also accepts, then the system bridges the telephone numbers and connects the call. Additional features may also be provided through the IVR recordings, for example, adding or removing numbers from the Do Not Call list.

20 Claims, 12 Drawing Sheets

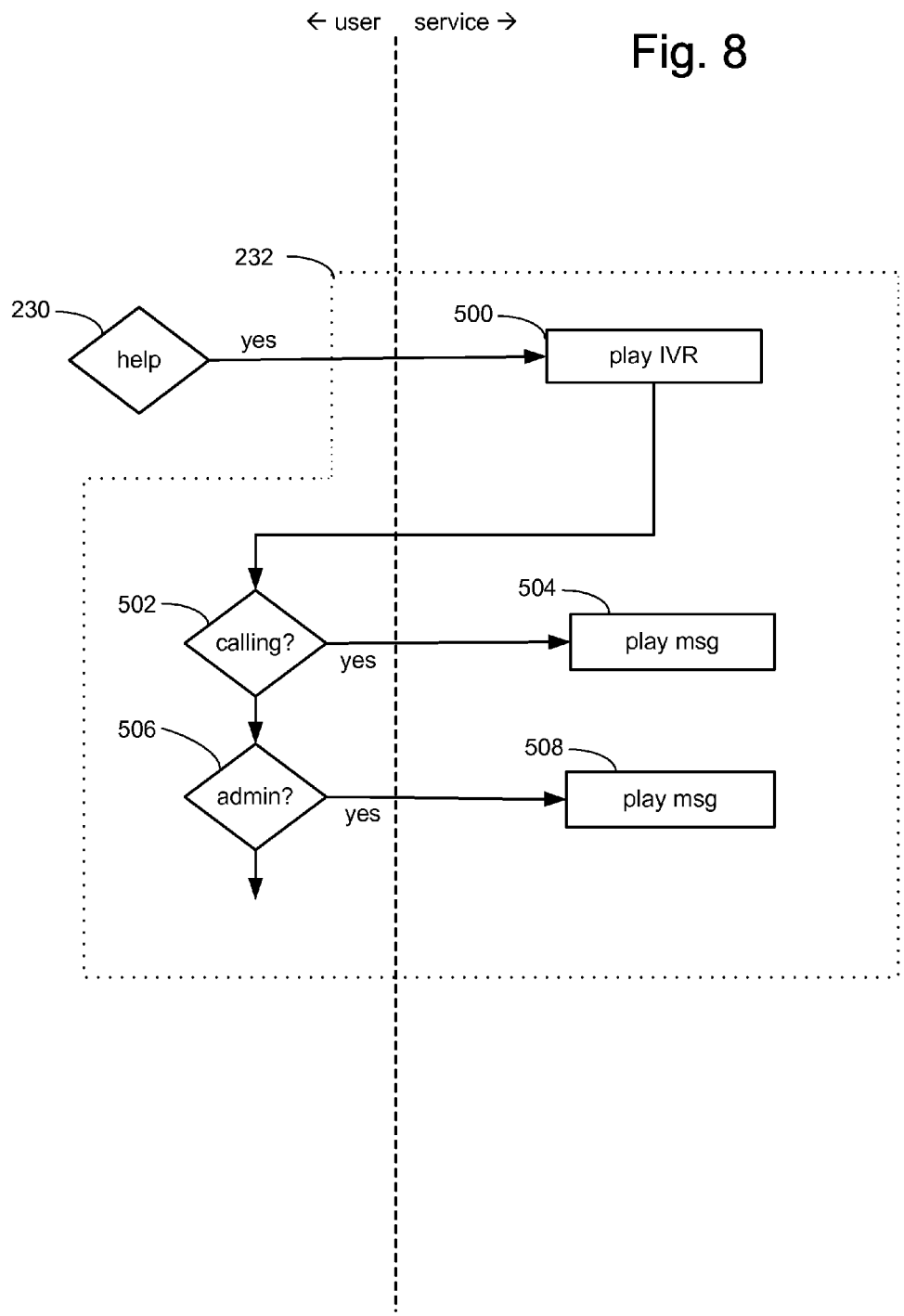

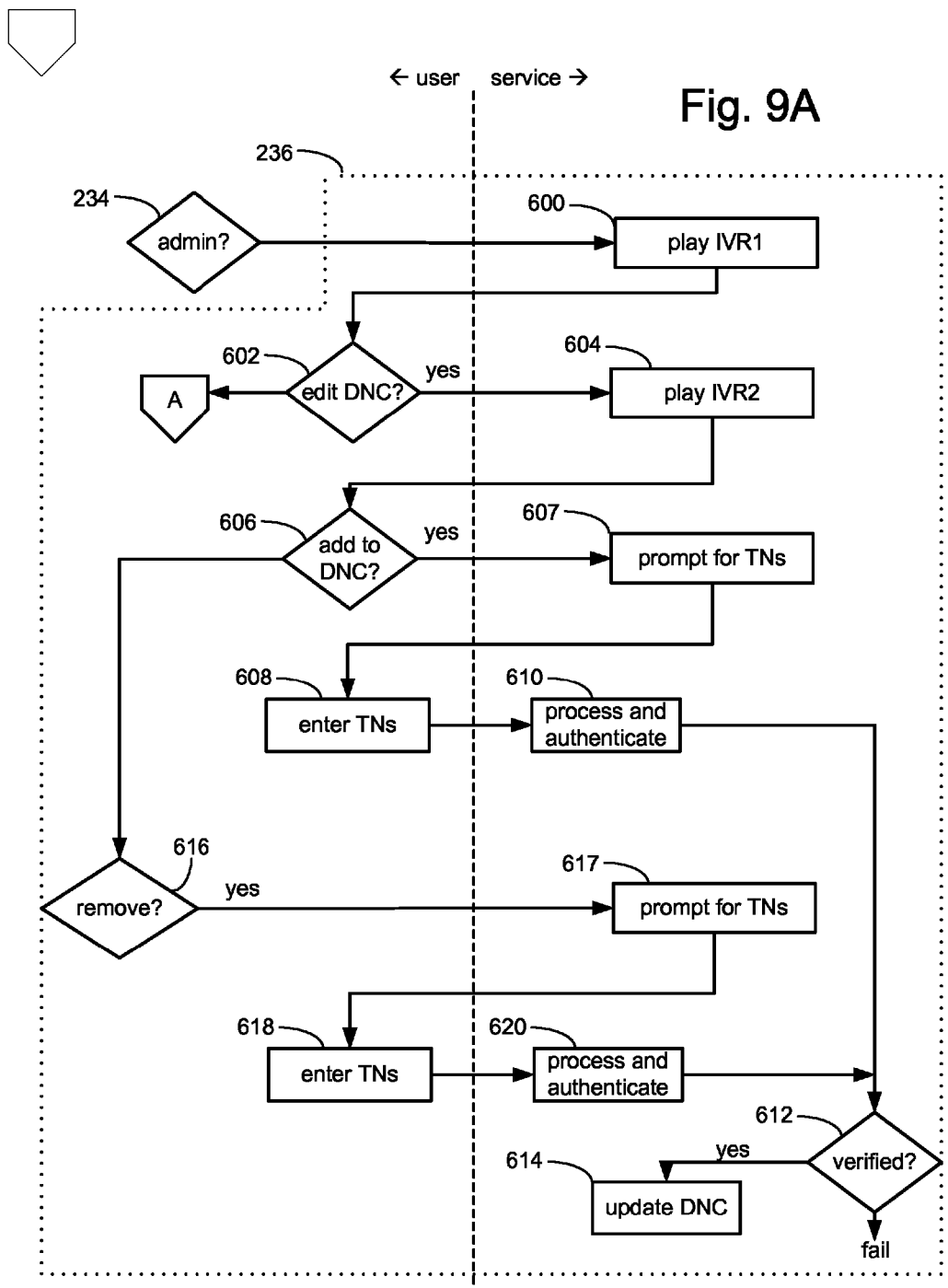

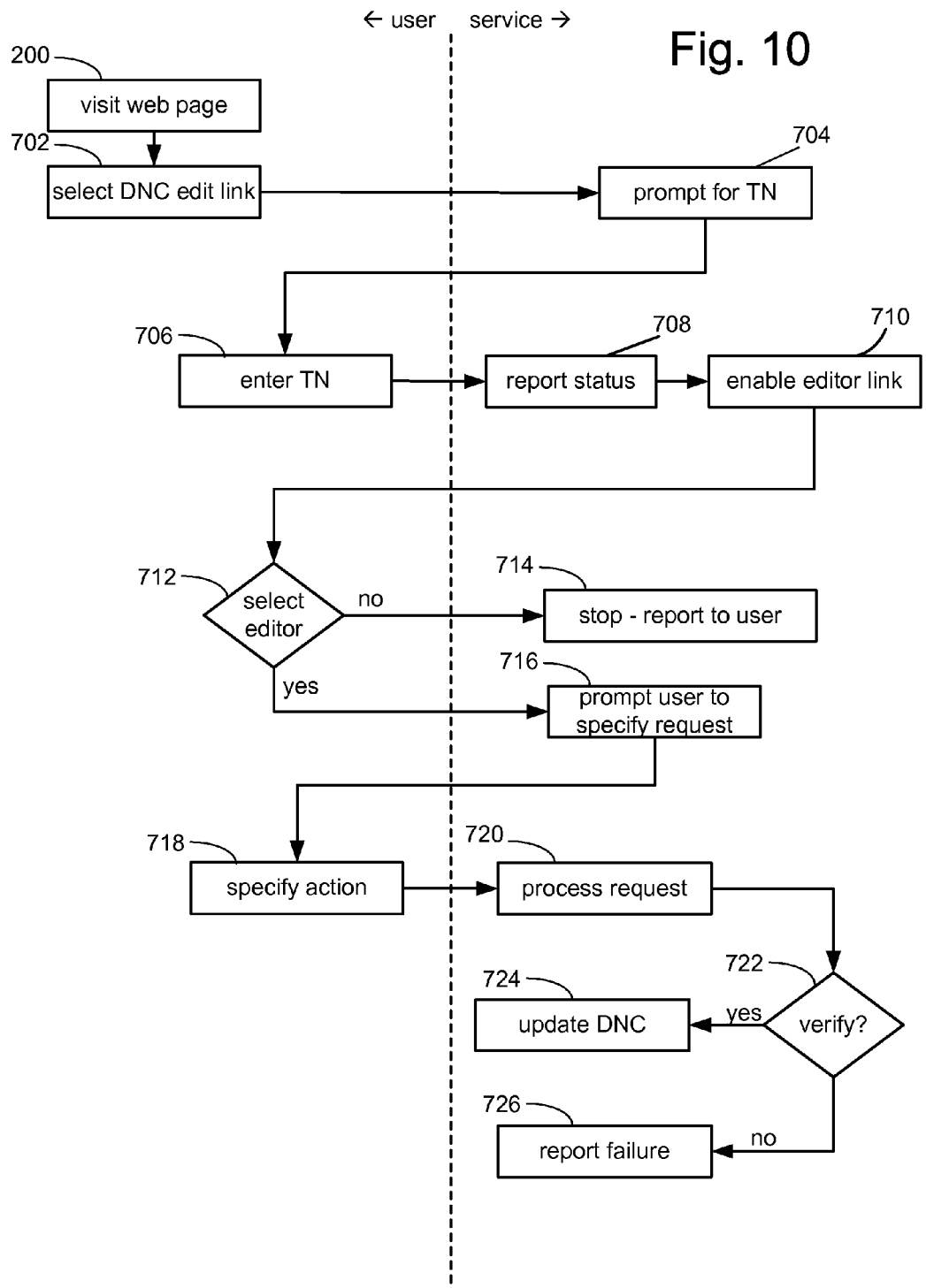

CALL AUTHORIZATIN FOR PAY-PER-CALL SERVICES

BACKGROUND

The World Wide Web has made it easier for people to communicate with each other. For example, consumers utilize search engines and keyword searches to identify merchants of desired goods and services, or to locate friends and family members. Further, because there is a significant potential market for consumers associated with the World Wide Web, merchants may use sponsored searches or pay for placement advertising in order to get their products and services identified for targeted consumers.

Notwithstanding the tremendous amount of information that may be obtained on the Internet, many consumers still prefer to speak to a live person at the merchant's place of business in order to confirm details or find out additional information, and to complete a sale. Likewise, when a user locates a person through an Internet search, it may be desirable to make immediate contact. While traditional public switched telephone networks (PSTN) are still a primary mode of voice communications, the use of Voice Over Internet Protocol (VoIP) is gaining popularity.

VoIP is a technology that allows users to make telephone calls using a broadband Internet connection instead of a regular phone line over the PSTN. Some VoIP services may only allow users to call other people using VoIP. However, many services also allow users to call anyone who has a telephone number, including local, long distance, mobile, and international numbers. While some services only work over a computer or a special VoIP phone, other services allow use of a traditional telephone through an adaptor.

To encourage the use of VoIP, service providers have sought ways to make VoIP more convenient and efficient to use. For example, some VoIP providers offer technology that identifies potential telephone numbers in content on the Internet by highlighting telephone numbers found in a web page and associating a hyperlink which allows a user to initiate a telephone call to the highlighted number.

On-line advertising has expanded to take advantage of VoIP. For example, advertisers can provide a hyperlink for a merchant telephone number, and clicking on the link will initiate a call to the merchant in the so-called click-to-call (C2C) model. Further, merchants may subscribe to a service using a pay-per-click (PPC) model, where the merchant is charged each time a consumer clicks on an advertising link for that merchant. Also, since consumers may want to avoid the charges associated with making a phone call, merchants can purchase a toll-free telephone number and therefore pay for incoming calls by consumers.

This may lead to potential problems, however, as malicious or prank telephone users may abuse the system by making unwanted calls, either individually or as part of a computerized dialing scheme, as part of a telemarketing campaign, or worse, as an intentional disruption directed at a specific merchant by a competitor or at a specific individual.

SUMMARY

The present disclosure uses an interactive voice response ("IVR") recording to authenticate telephone calls initiated by a web-based user. In one embodiment, the web-based user enters his telephone number, and the system generates an automated telephone call to that number. When answered, an IVR message is played, and several choices are provided, including choices to accept or reject a proposed connection to one or more other telephones. If the user accepts the proposed connection, then the other telephone number or numbers identified by the user are called by the system, which then bridges and connects the numbers. If the user rejects the proposed connection, then the user may, if he so desires, be added to a Do Not Call list. Alternatively, the user may be added to the Do Not Call list involuntarily if he rejects proposed connections more than a few times.

In another embodiment, the other telephone numbers are also presented with an IVR message when answered, and the choice to accept or reject the proposed connection. Further, other IVR choices can be presented to all telephone numbers. For example, one choice allows a user to edit preferences, and may provide a means for the user to add or remove his telephone number from the Do Not Call list.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is a flowchart further describing another portion of the flowchart of FIG. 5.

FIGS. 9A and 9B are flowcharts further describing another portion of the flowchart of FIG. 5.

FIG. 10 is a flowchart describing a web-based user interface with a portion of the process shown in FIG. 5.

DETAILED DESCRIPTION

A web-based user can initiate telephone calls from a computer using a call bridging service that includes voice over internet protocol ("VoIP"). However, since the call initiation is web-based and typically does not require identification of the user through a sign-in process, for example, the opportunity to send calls to any telephone number (i.e. spam) is an inherent risk for the call bridging service. The present disclosure provides a means to mitigate that risk by using an interactive voice response ("IVR") recording to authenticate telephone calls initiated by a web-based user. In one embodiment, the web-based user selects a telephone number to call, and is then prompted to enter his own telephone number. When entered, the system generates an automated telephone call to the user's telephone number. When answered, an IVR message is played, and choices are provided, including choices to accept or reject a proposed connection to one or more other telephones. For example, if the user accepts a proposed telephone connection, then the service generates a call to the telephone number identified by the user, when answered, the services bridges and connects the numbers.

In another embodiment, the other telephone numbers identified by the web-based user and called by the service are also presented with an IVR message when answered. Further, choices other than "accept" or "reject" can be presented to all telephone numbers. For example, one choice allows a user to edit preferences, and may provide a means for the user to add or remove his telephone number from the Do Not Call list.

Figure 1:
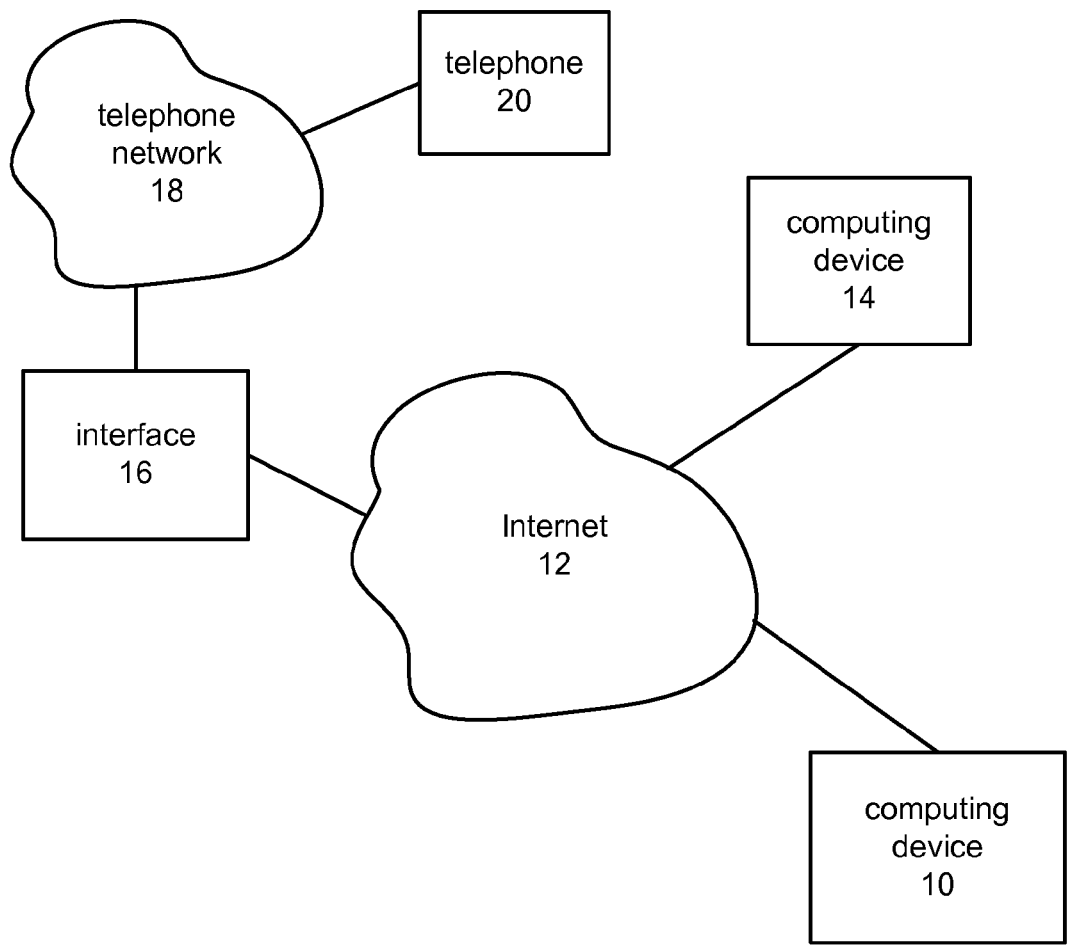
FIG. 1 is a block diagram illustrating one embodiment of a system that provides for voice communication over a network.

FIG. 1 is a general block diagram depicting one embodiment of a system that provides for communication (e.g., VoIP) over a network, where computing device 10 is in communication with a network 12, such as the Internet. Computing device 10 can be any suitable computing device including a personal computer, notebook computer, handheld device, mobile telephone, etc. Computing device 10 includes adequate software and/or hardware to allow communication over Internet 12. For example, computing device 10 may include a VoIP software application that communicates over a network interface, or another communications application (such as messenger) having VoIP capabilities.

FIG. 1 also shows computing device 14 and interface 16 in communication with Internet 12. Interface 16 is also in communication with telephone network 18. Computing device 14 can be any type of computing device that can communicate with other computing devices. Telephone network 18 is the well known public switched telephone network (PSTN). Interface 16 includes hardware that provides an interface between the legacy telephone network 18 and the data network of Internet 12. For example, interface 16 can be one or more computers that receive VoIP communications via Internet 12 and transfer those communications to telephone network 18, as well as transfer voice communications from telephone network 18 to VoIP communications over Internet 12. It is contemplated that a user A of computing device 10 will make a telephone call using VoIP technology to another user B on a standard telephone 20, although user B could also have VoIP capability on computing device 14.

Figure 2:
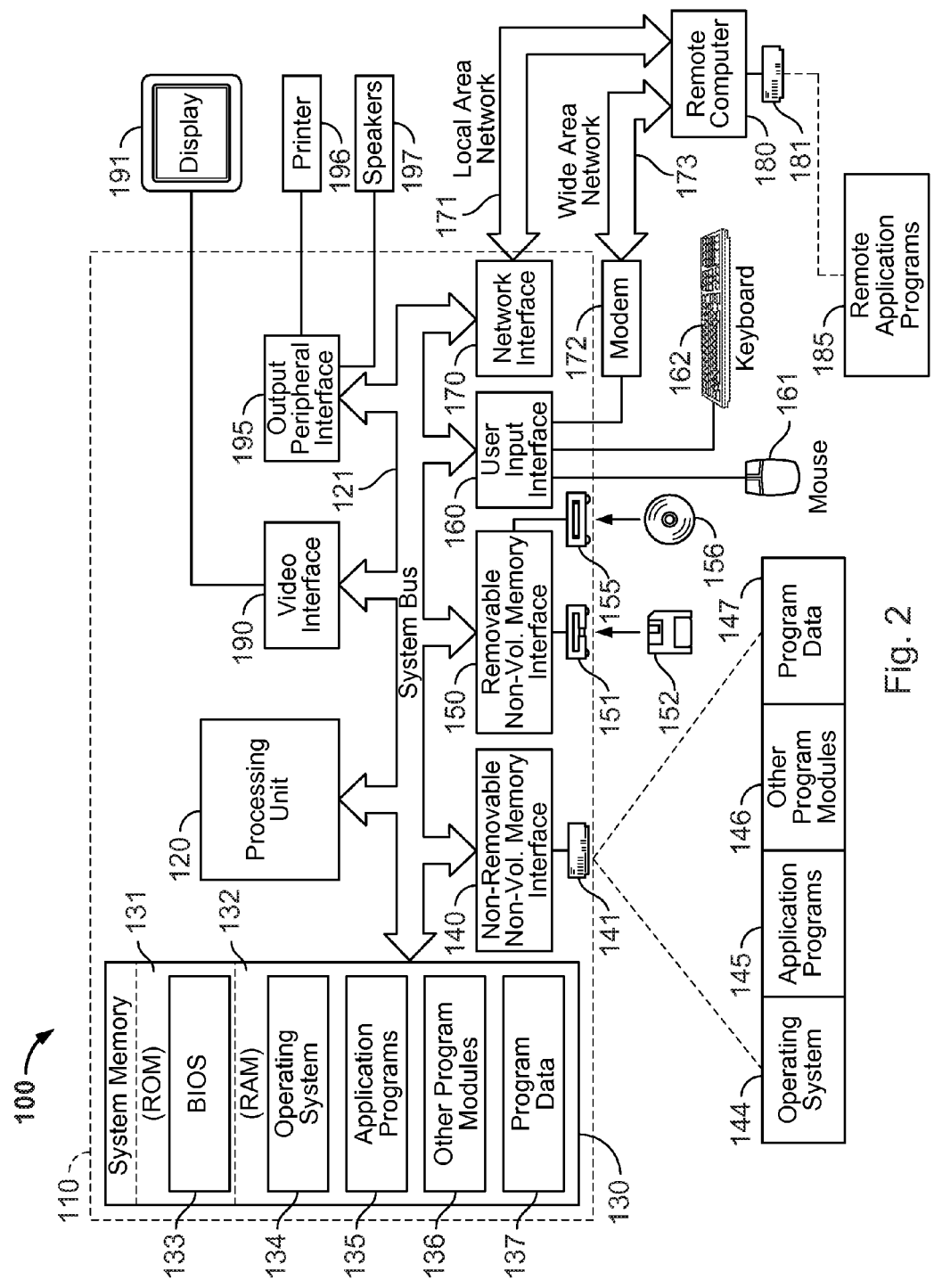
FIG. 2 is a block diagram illustrating one embodiment of a typical computing system.

FIG. 2 illustrates one example of a suitable general computing environment 100 that may be used to implement some of the components illustrated in FIG. 1. For example, computing system 100 can be used to implement user computing device 10, computing device 14, or interface 16. It should be noted that computing system 100 is only one example of a suitable computing environment and is not intended to suggest any limitation as to the scope of use or functionality of the technology described herein. Neither should computing system 100 be interpreted as having any dependency or requirement relating to any one or combination of components illustrated in the exemplary operating environment 100.

The technologies described herein are operational with numerous general purpose or special purpose computing system environments or configurations. Examples of well known computing systems, environments, and/or configurations that may be suitable for use include, but are not limited to, personal computers, server computers, hand-held or laptop devices, personal digital assistants, telephones (wired, wireless, or cellular), multiprocessor systems, microprocessor-based systems, set top boxes, programmable consumer electronics, network PCs, minicomputers, mainframe computers, distributed computing environments that include any of the above systems or devices, and the like.

The system may be described in the general context of computer-executable instructions, such as program modules, being executed by a computer. Generally, program modules include routines, programs, objects, components, data structures, etc., that perform particular tasks or implement particular abstract data types. The system may also be implemented in distributed computing environments where tasks are performed by remote processing devices that are linked through a communications network. In a distributed computing environment, program modules may be located in both local and remote computer storage media including memory storage devices.

With reference to FIG. 2, an exemplary computing system includes a general purpose computer 110. Components of computer 110 may include, but are not limited to, a processing unit 120 (which can include multiple processors), a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data to program the processor(s) to perform the methods described herein. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

Computer 110 may operate in a networked environment using logical connections to one or more remote computers, such as a remote computer 180. Remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet. In one embodiment, computing device 10 of FIG. 1 is implemented by computing device 110, and computing device 14 could be implemented by remote computer 180.

When used in a LAN networking environment, computer 110 is connected to LAN 171 through a network interface or adapter 170. When used in a WAN networking environment, computer 110 typically includes a modem 172, network interface or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

One embodiment of the present system is directed to the specific example where a web-based user initiates a telephone call to a target telephone number via a call management service. Another embodiment of the present system is directed to the specific example where the web-based user initiates the telephone call via a call hyperlink on a web page. This type of hyperlink is a known feature of click-to-call services that are routinely provided by a service provider, which may be an enterprise service provider, such as MSN®, Yahoo®, AOL®, or other online service providers.

Figure 3A:
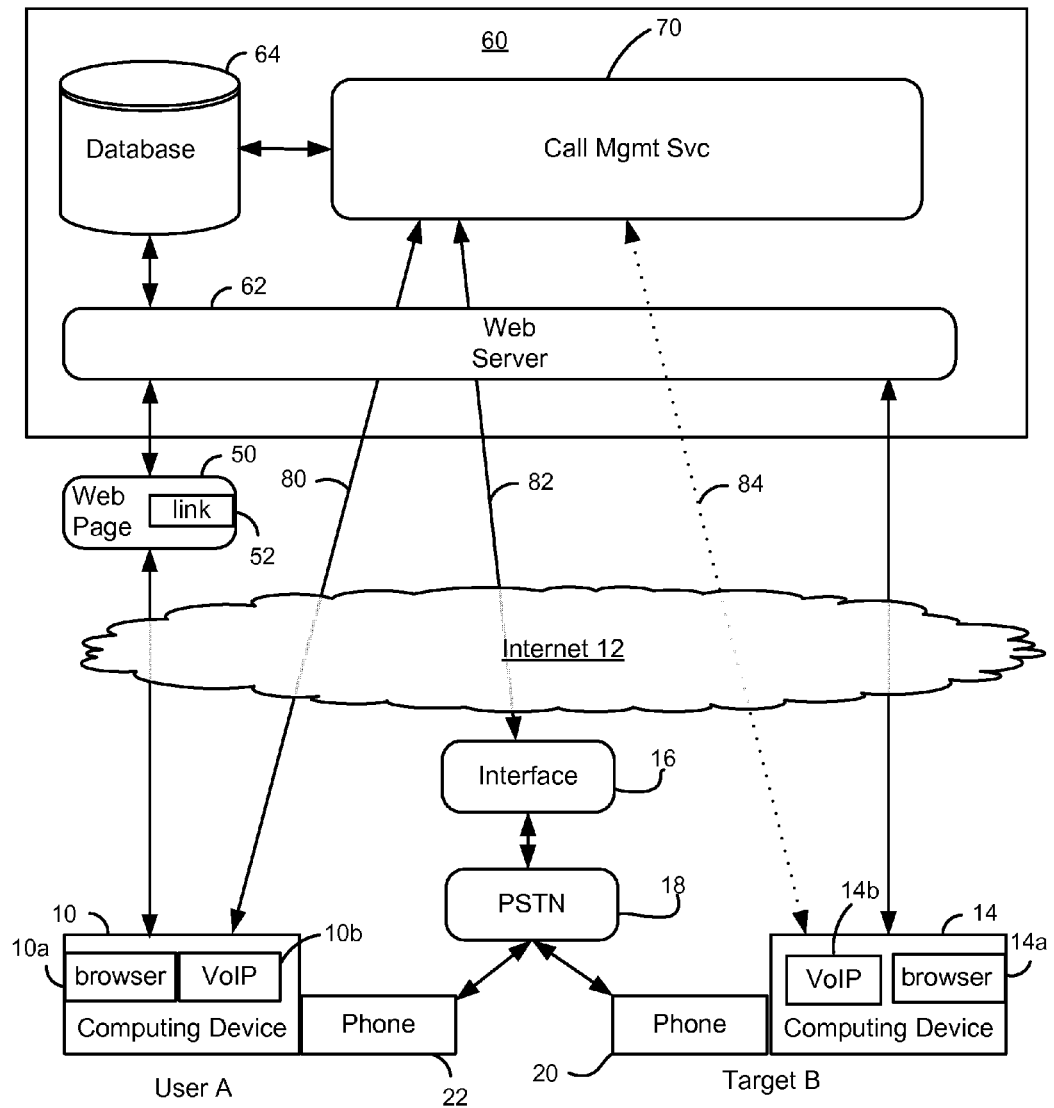
FIG. 3A is a block diagram illustrating a detailed embodiment of the voice communication system of FIG. 1.

With reference to FIG. 3A, a more detailed illustration of a typical computer-initiated voice communication system is provided. In an illustrative example, web-based user A seeks to initiate a telephone call to target B. User A uses computing device 10, which includes a client application 10a, such as a web browser, and a VoIP application 10b. It is understood that client application 10b may be another type of client application, including for example, an instant messaging (IM) client having VoIP capability, or a dedicated VoIP application. User A also has a traditional telephone 22 coupled to the PSTN 18. Target B uses a traditional telephone 20 coupled to the PSTN 18. The telephones 20 and 22 may be wireless, cellular, or satellite telephones.

In another embodiment, target B may use computing device 14, which is similarly configured as computing device 10 to have a client application 14a, such as a web browser, and a VoIP application 14b.

In one embodiment, the computing device 10 of user A accesses the World Wide Web through browser 10a establishing communication with Internet 12, for example, to obtain and view a copy of web page 50. In some embodiments, web page 50 may be generated by a web server 62, which is part of service provider 60. However, it is understood that web page 50 may be included on a web server which is located outside of and independent from service provider 60. Whether it is part of web server 62, or merely in communication with web server 62, the information displayed on web page 50 may be updated from database 64 at the service provider 60 before being rendered on web page 50, or it may results from any number of sources, such as a search by a search engine hosted by service provider 60, a listing service provided by a partner of service provider 60, or a listing of personal contact information stored by service provider 60 on behalf of the user.

In one embodiment, the web page 50 contains suitable instructions and at least one link 52 that initiates a call management routine managed by a call management service 70, which is offered by service provider 60. The call management service 70 is configured to handle web-based requests to initiate telephone calls, and to enable a VoIP connection 80 between user A's computer 10 and the call management service 70. The call management service is also configured to enable a connection 82 to the PSTN network interface 16, and if necessary, a second VoIP connection 84 to computing device 14. The call management routine typically prompts the user to enter his own telephone number for telephone 22, as well as the target telephone number he wishes to call, and after an authorization routine, the call management service bridges the two numbers to connect the call.

Figure 3B:
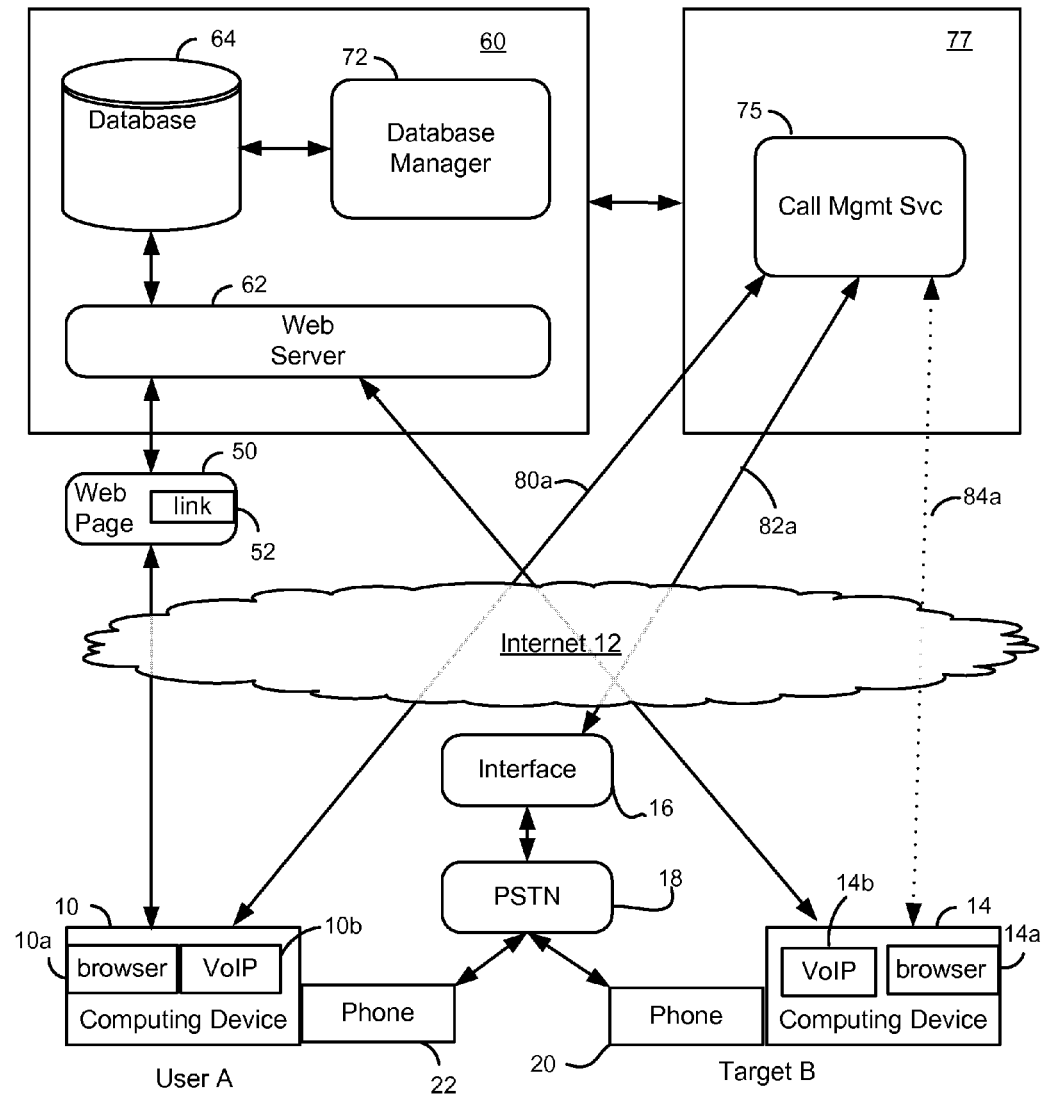
FIG. 3B is a block diagram illustrating another detailed embodiment of the voice communication system of FIG. 1.

In one embodiment, shown in FIG. 3B, the call management service 75 is provided by a third party 77, and not by the primary service provider 60. The web page 50 thus contains a link 52 that initiates a call management routine managed by a database manager 72 at the primary service provider, and the database manager does the basic handling of user requests for VoIP services, but contracts the handling of actual call management and bridging functions to the third party call management service 75. The call management service 75 thus enables VoIP connection 80a between user A's computer 10 and the call management service 75, as well as connection 82a to the PSTN network interface 16, and if necessary, a second VoIP connection 84a to computing device 14, after a successful authorization routine.

In another embodiment, the link 52 in web page 50 is a special call hyperlink that, when selected, initiates a process to call a target telephone number associated with the hyperlink, rather than requiring the user to enter a target telephone number in response to a prompt. The call hyperlink is a well known feature provided by service providers and need not be described in detail herein. For example, the service provider 60 may have a call management service 70, such as Windows Live (http://get.live.com), that is utilized to implement the call hyperlink and related functions, as well as the interactive voice recording schemes described below.

Figure 4:
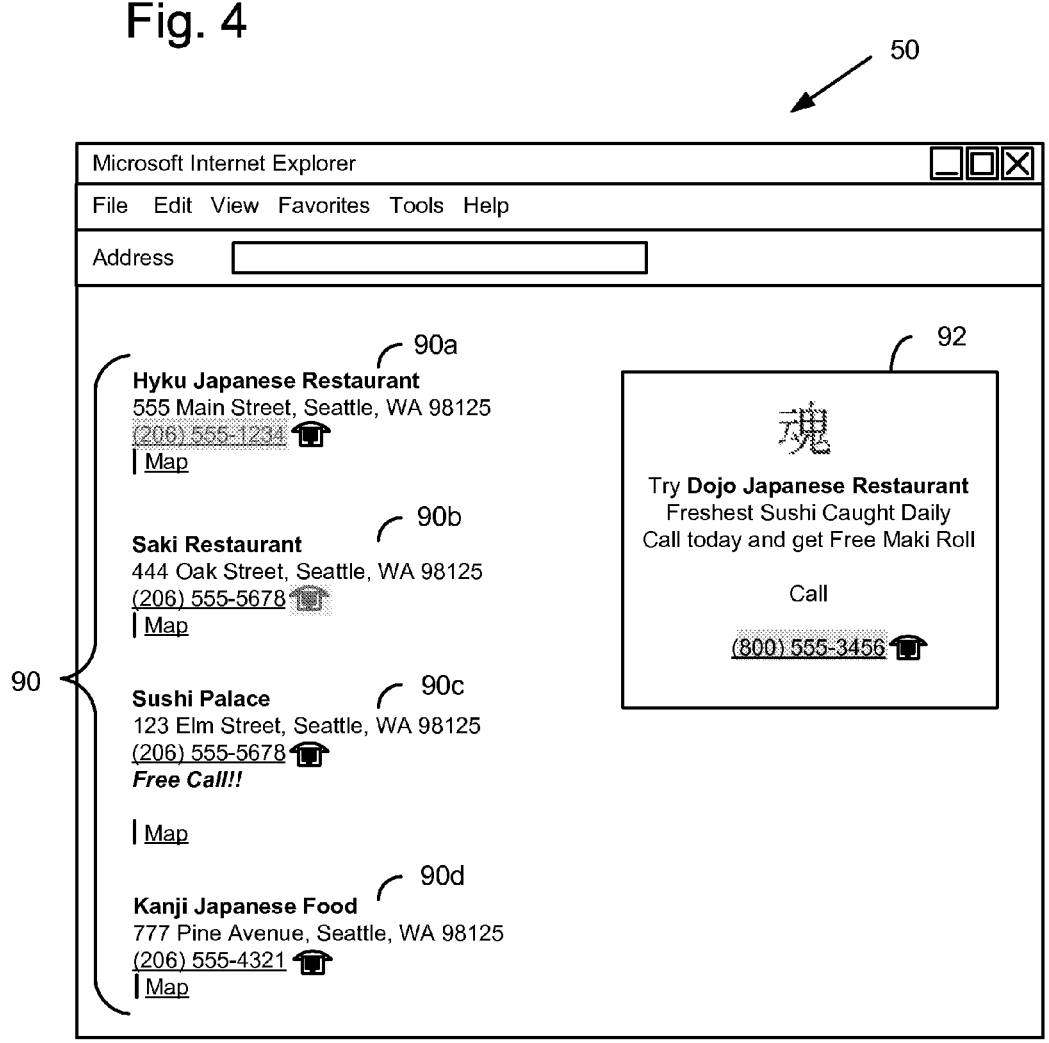
FIG. 4 is an example of a web page displaying search results.

In one embodiment, telephone listings may be rendered on web page 50 with graphical indicators indicating the click-to-call feature. For example, FIG. 4 shows the results of a sample search for Japanese restaurants in the Seattle, Wash. area on web page 50. The search results include advertising listings 90 and a larger space advertisement 92. As shown in FIG. 4, the click-to-call service may be indicated by any of a variety of graphical indicators.

For example, in listing 90a and in the larger space advertisement 92, the click-to-call service is indicated by highlighting or shading the telephone number. The click-to-call feature may alternatively or additionally be indicated by a highlighted, shaded and/or dedicated icon as part of the listing, such as the highlighted telephone icon shown in advertising listing 90b. Additionally or alternatively, the click-to-call feature may be indicated by the words "Free Call!!" or other verbal phrase, as shown in advertising listing 90c. Those of skill in the art would appreciate that there are many other ways of visually indicating to potential callers the click-to-call feature according to the present system.

In some embodiments, all telephone numbers listed on web page 50 are provided with a click-to-call indicator. In other embodiments, the click-to-call indicator is only activated for telephone numbers that have been subscribed to an advertising service provided by service provider 60. Thus, for example, as shown in FIG. 4, the advertiser at listing 90d does not subscribe to the advertising service and therefore its listing does not include any graphical indicator for a call hyperlink. However, a service provider may elect to provide the click-to-call feature to all advertisers returned in a search results page or otherwise provided on a web page 50 regardless of whether the advertisers specifically pay for that feature.

Web-based users may access a web page 50 having telephone listings, such as a directory search result or merchant advertisement, over a network, such as the Internet 12. Web-based users who wish to establish a telephone session with a telephone number listed on web page 50 may click on an advertisement, telephone number, and/or icon including the click-to-call hyperlink and associated indicator as displayed on web page 50.

Figure 5:
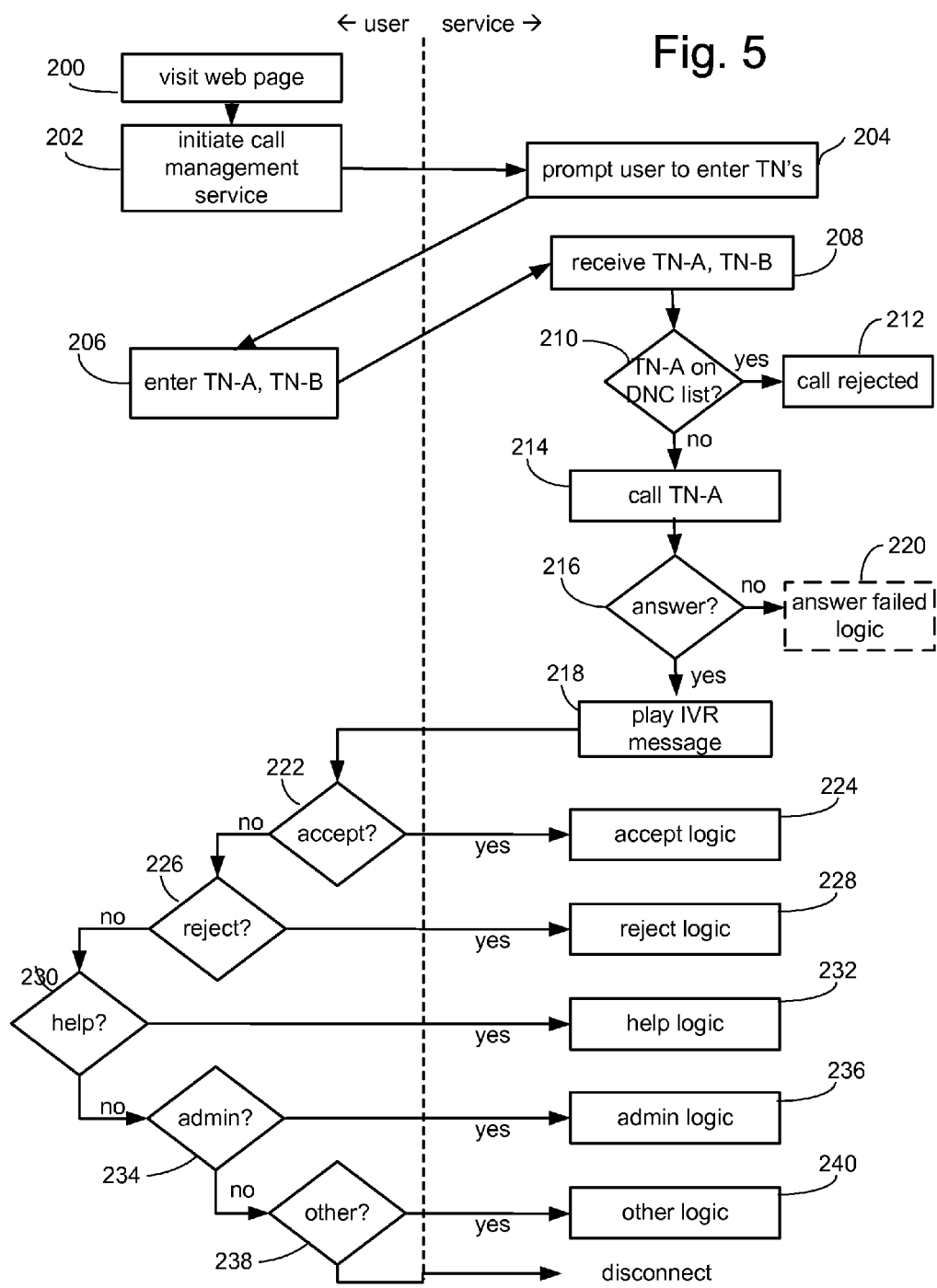
FIG. 5 is a flowchart describing an embodiment of a process for using an IVR to authenticate proposed calls with a VoIP communication system.

FIG. 5 is a flowchart describing one embodiment of a process for using an interactive voice recording to authorize calls initiated by a web-based user. In step 200, the web-based user visits web page 50 or another document that includes a link 52 to initiate a call management routine hosted by call management service 70. In step 202, the web-based user selects the link to initiate the call management service. In step 204, the system prompts the user to enter his own telephone number (TN-A) as well as the target telephone number (TN-B) he desires to call, and in step 206 the user does so. In step 208, the call management service receives the telephone numbers TN-A and TN-B entered by the user. In step 210, the system checks the user's number TN-A against a Do Not Call list stored on database 64. If the user's telephone number TN-A is on the DNC list, then the call is rejected by the system in step 212.

If the web-based user's telephone number TN-A is not on the DNC list, then in step 214, the service calls the number TN-A. If the line is answered in step 216, then a first recording from an interactive voice response ("IVR") system is played in step 218. If the line is not answered in step 216, then no additional action need be taken, or a "no answer" logic scheme may be used in step 220. The IVR recording is typically stored on database 64, but in the embodiment shown in FIG. 3B, the IVR recording may be stored in relevant storage at the third party service provider 77. IVR is a well known technique that uses a computerized system to permit a telephone caller to select one or more options from a voice menu. Generally, such a system plays pre-recorded voice prompts, and the caller either presses a number on a telephone keypad to select the desired option, or speaks a simple answer, such as "yes" or "no" or other predefined answers to the voice prompts.

The IVR recording provides an initial greeting message, then provides instructions and prompts the user to make a choice. In accord with the current disclosure, the primary choices presented by the first recording are whether to accept or reject the proposed voice connection between the first telephone number and the second telephone number. For example, the recording may say "press 1 to accept the proposed call, or press 2 to reject the proposed call." Alternatively, the recording may say "say YES to accept the proposed call, or say NO to reject the proposed call."

In one embodiment, the IVR recording provides an interactive message with multiple menu options that may be selected by touching a keypad number. An exemplary message may state:

"Welcome to the Acme Call Management Service. You have requested a call be placed to the following number: xxx-xxx-xxxx. Press 1 to accept this call. Press 2 to reject this call. Press 3 for help. Press 4 for administrative functions, including editing Do Not Call lists. Press 5 for other options. Press 9 to disconnect."

Figure 6:
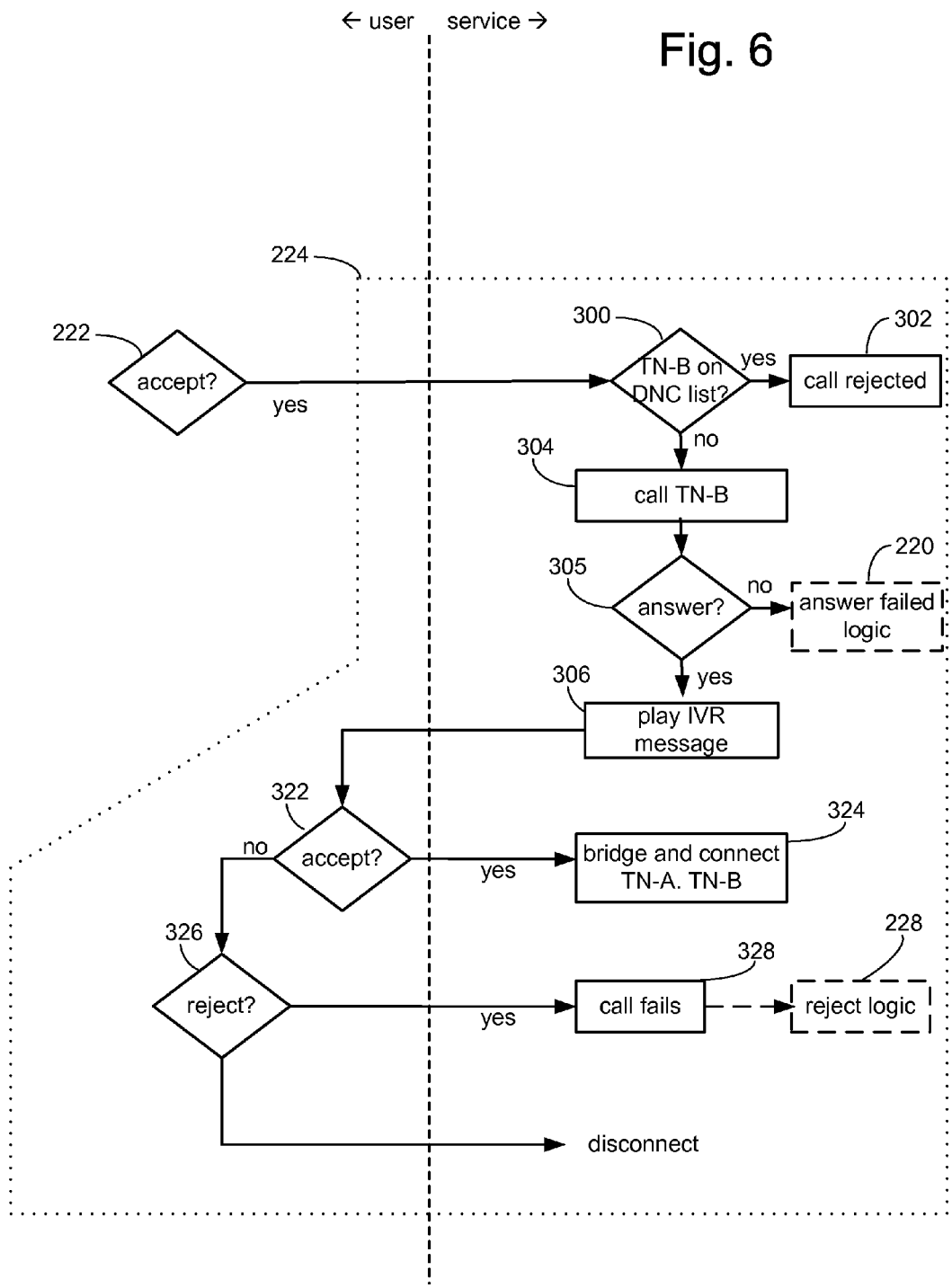
FIG. 6 is a flowchart further describing a portion of the flowchart of FIG. 5.

If user A selects choice 1 in step 222, then a first routine (accept logic) is performed at step 224 (see FIG. 6). If user A selects choice 2 in step 226, then a second routine (reject logic) is performed at step 228 (see FIG. 7). If user A selects choice 3 in step 230, then a third routine (help logic) is performed at step 232 (see FIG. 8). If user A selects choice 4 in step 234, then a fourth routine (admin logic) is performed at step 236 (see FIG. 9). If user A selects choice 5 in step 238, then a fifth routine (other logic) is performed at step 240. As will be understood, any number of menu options and routines may be implemented. If user A selects any other choice, i.e., choices 6 through 9, then it is treated as a disconnect request, and the call management routine ends.

Referring now to FIG. 6, if user A accepts the proposed voice connection in step 222, then accept logic 224 is performed. In step 300, the call management routine checks to see if the target number TN-B is on the DNC list. If so, then in step 302, the call is rejected. Optionally, steps 300 and 302 may be performed after or simultaneously with step 210. If not, then in step 304, the call management service calls the target telephone number (TN-B). In some embodiments, when the target telephone number is answered, all the numbers are bridged and the call is connected. However, in the present embodiment, when the target telephone number is answered in step 305, a second recording from the IVR system is played in step 306. The second recording may be the same or similar to the first recording, and also presents the primary choices of whether to accept or reject the proposed voice connection.

In one embodiment, the second IVR recording provides an interactive voice message with limited menu options that may be selected by touching a keypad number. An exemplary message may state:

"Welcome to the Acme Call Management Service. You are being called by the following number: xxx-xxx-xxxx. Press 1 to accept this call. Press 2 to reject this call. Press 9 to disconnect."

If target B selects choice 1 in step 322, then in step 324, the call management service bridges the two telephone numbers and the call is connected. If target B selects choice 2 in step 326, then the call fails in step 328 and the numbers will not be bridged. Optionally, reject logic 228 could also be applied to calls rejected by the target after step 328. If target B selects any other choice, i.e., choices 3 through 9, then it is treated as a disconnect request, and the call management routine ends.

Figure 7:
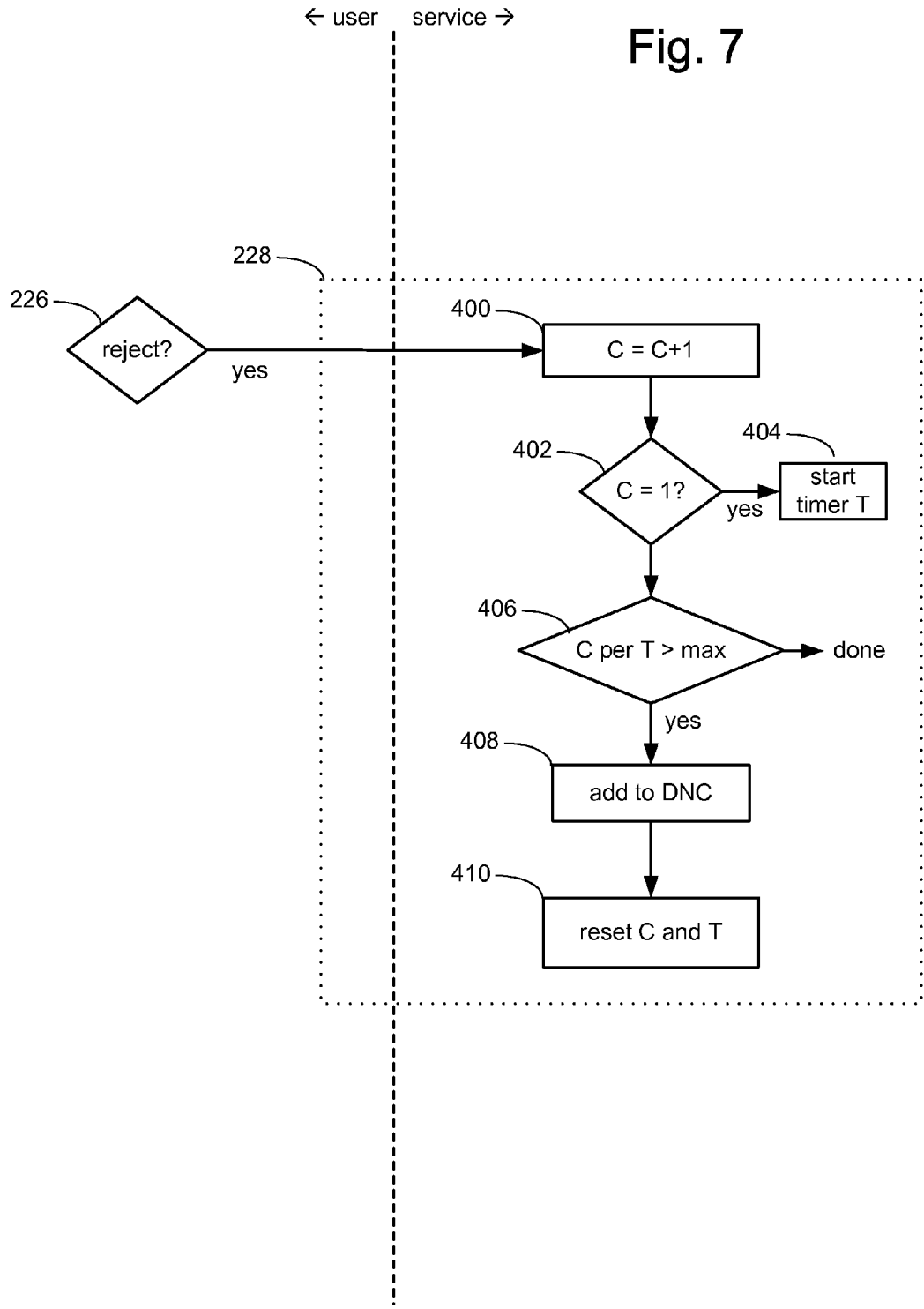
FIG. 7 is a flowchart further describing another portion of the flowchart of FIG. 5.

Referring now to FIG. 7, if user A rejects the proposed call by selecting choice 2 in step 226, then reject logic 228 is performed. In step 400, the system begins to count the number of times within a set time period that TN-A has rejected proposed calls by incrementing a counter C. The status of the counter is checked in step 402, and if equal to one, then timer T is started in step 404, and the routine is done for this pass.

If the counter C is not equal to one in step 402, then the number of counts per time period is compared to a maximum value in step 406. For example, a typical maximum could be defined as three rejected calls within sixty minutes. If the maximum is not exceeded, then the routine is done for this pass. If the maximum is exceeded in step 406, then the user's telephone number TN-A is added to the Do Not Call list in step 408, and the timer and counter are reset in step 410.

In FIG. 8, exemplary help logic 232 is illustrated for the case when user A selects choice 3 in step 230. In step 500, a third IVR recording is played to user A. An exemplary message may state:

"Welcome to the Help Menu for the Acme Call Management Service. Press 1 for help with initiating a call. Press 2 for help with administrative functions."

In step 502, the user selects choice 1, and a relevant help message is played in step 504. Step 504 may include a series of help messages and menu choices which are selectable by the user. In step 506, the user selects choice 2, and a relevant help message is played in step 508. Step 508 may also include a series of help messages and menu choices which are selectable by the user. Any number of additional menus and help messages could be provided as desired.

Figure 9B:
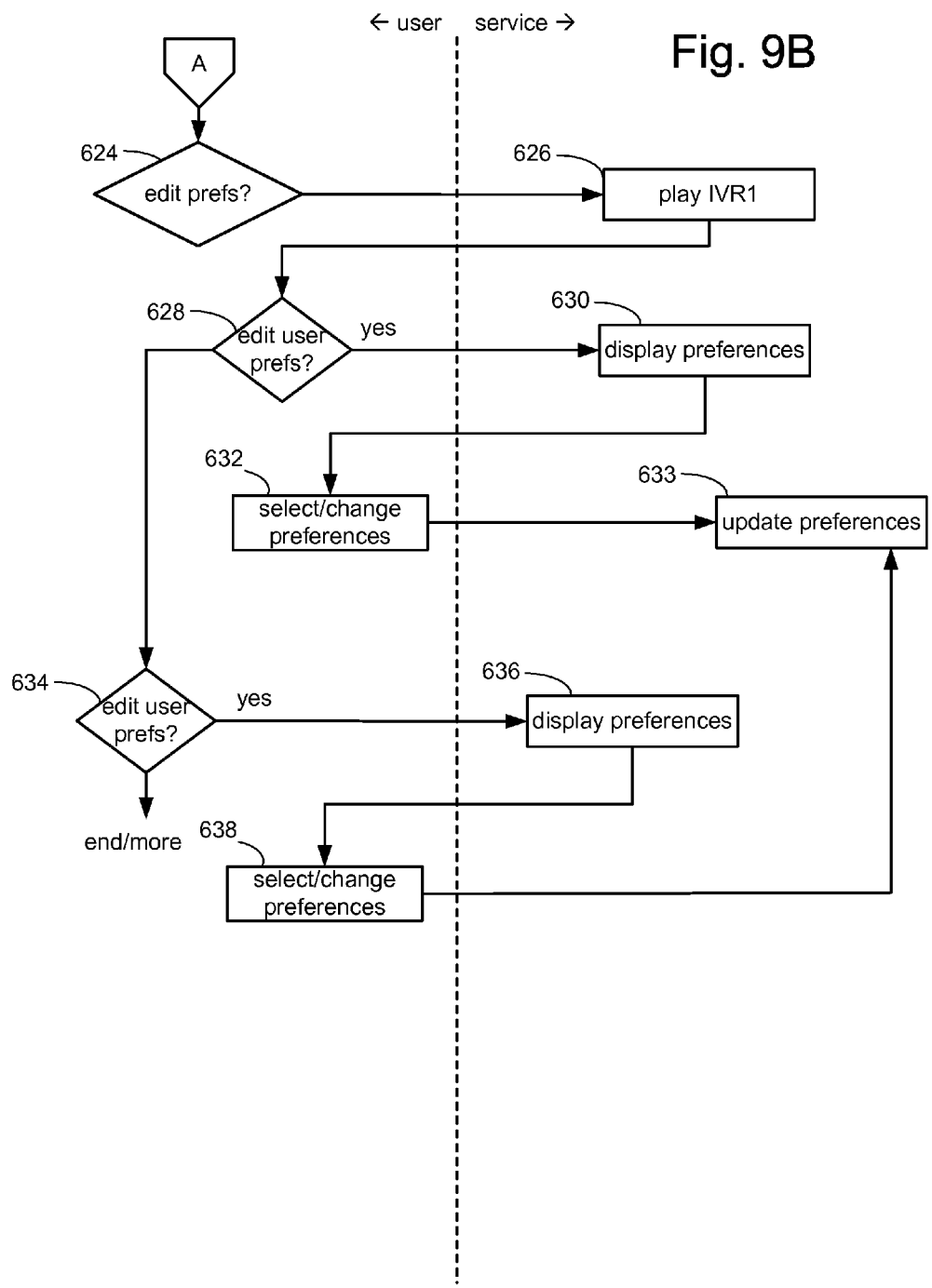

In FIGS. 9A and 9B, exemplary logic for using administrative functions 236 is illustrated for the case where user A selects choice 4 in step 234. In step 600, an IVR recording is played to the user. For example, an exemplary recording may say:

"Welcome to the Administrative Functions Menu for the Acme Call Management Service. Press 1 for editing the Do Not Call list. Press 2 for editing preferences."

Additional choices may be implemented as desired. In step 602, if user A selects choice 1 to edit the Do Not Call list, another IVR recording is played to the user in step 604. For example:

"Press 1 for adding numbers to the Do Not Call list. Press 2 for removing numbers from the Do Not Call list."

In step 606, the user selects choice 1, and is then prompted in step 607 to enter the numbers he wishes to add to the DNC, which he does in step 608. In step 610, the call management service processes and authenticates the user's request. It is noted that the service may ask the user to complete a number of additional steps in order to verify that this is a proper request. If the request is verified in step 612, then the system updates database 64 in step 614. If not, then the routine ends.

In step 616, the user selects choice 2, and is then prompted in step 617 to enter the numbers he wishes to remove from the DNC, which he does in step 618. In step 620, the call management service process and authenticates the user's request. As before, the service may ask the user to complete a number of additional steps in order to verify that this is a proper request. If the request is verified in step 612, then the system updates database 64 in step 614. If not, then the routine ends.

If in response to the IVR menu played in step 600 the user selects choice 2 for preference editing in step 624, then another IVR recording played to the user in step 626, for example:

"Press 1 for editing user preferences. Press 2 for editing system preferences."

If the user selects choice 1 in step 628, then relevant preferences are displayed in step 630 in a mode that permits editing, and the user enters desired updates in step 632. In step 633, the system updates the preferences stored on database 64, for example. If the user selects choice 2 in step 634, then relevant preferences are displayed in step 636 in a mode that permits editing, and the user enter updates in step 638. The system updates the preferences in step 633. Other system characteristics, such as for example, display layout, toolbars, and language, could also be edited by providing additional menu choices and processing blocks.

Another embodiment provides for a web-based interface for accessing the DNC list, as shown in FIG. 10. For example, the user visits web page 50 in step 200 as before. However, web page 50 may also include a link that provides an entry point to an editor function for the DNC list. In step 702, the user selects the link. In step 704, the user is prompted to enter his telephone number TN-A, for example, via a pop-up windonw. In step 706, the user enters the requested information. The system responds in step 708 by providing the status of telephone number TN-A to the user and enabling a link to the editor function in step 710. If the user does not select the editor link in step 712 within a short time period, for example, one minute, then the process stops and reports to the user in step 714. If the user does select the link, however, then in step 716, the system prompts the user, for example, with a pop-up window, to specify the action requested. For example, a typical window may be coded to provide selectable choices for the user to remove his number from the DNC list or add his number to the DNC list. In step 718, the user specifies his action by making an appropriate selection as directed on the pop-up window. In step 720, the system processes the request. The request processing also includes additional step 722 to verify that this is a proper request from the web-based user. If the request processing is successful and the user's action is verified, then the status of number TN-A on the DNC list is updated in step 724. If the request is not successful, then the failure is reported to the user in step 726.

Additional IVR menus could be added to address other services and issues, including, for example, account information, order placement, caller identification and routing, surveys, schedules, etc. Once a user's telephone number has been authorized, subsequent calls may trigger additional IVRs that provides choices to learn more about the call management service and the IVR menus.

It should be readily evident that IVR menus could be implemented based on a variety of criteria. For example, additional IVR menus could be added to address other services and issues, including, for example, account information, order placement, caller identification and routing, surveys, schedules, etc. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method for establishing voice communications upon initiation by a web-based user, comprising:
   receiving at least a first telephone number and a second telephone number from the web-based user, wherein receiving the second telephone number includes receiving a selection of a link from the web-based user, the link identifying the second telephone number;
   generating a first automated call to the first telephone number
   providing a first interactive voice menu of choices to the first telephone number, the first interactive voice menu of choices including a first menu of choices to accept or reject a proposed voice communication that connects the first telephone number and the second telephone number, and a second menu of choices to edit a status associated with the first telephone number, the second menu of choices to edit the status associated with the first telephone number including choices to add the first telephone number to a do not call list or remove the first telephone number from the do not call list;
   establishing a voice connection between the first telephone number and the second telephone number if the first telephone number accepts the proposed voice communication; and
   providing a process for adding the first telephone number to the do not call list and for removing the first telephone number from the do not call list in response to a choice selection from the second menu of choices to add the first telephone number to the do not call list or remove the first telephone number from the do not call list.

2. The method of claim 1, further comprising:
   verifying that the first telephone number is not on a do not call list prior to generating the first automated call.

3. The method of claim 1, further comprising:
   generating a second automated call to the second telephone number;
   providing a second interactive voice menu of choices to the second telephone number, the second interactive voice menu of choices including a third menu of choices to accept or reject the proposed voice communication that connects the first telephone number and the second telephone number and a fourth menu of choices to edit a status associated with the second telephone number, the fourth menu of choices to edit the status associated with the second telephone number including choices to add the second telephone number to the do not call list or remove the second telephone number from the do not call list; and
   establishing a voice connection between the first telephone number and the second telephone number if both the first telephone number and the second telephone number accept the proposed voice communication.

4. The method of claim 3, further comprising:
   verifying that the second telephone number is not on a do not call list prior to generating the second automated call.

5. The method of claim 1, further comprising:
   receiving a call initiation request from the web-based user; and
   generating a request to the web-based user to provide the first telephone number.

6. The method of claim 5, further comprising:
   generating a request to the web-based user to provide the second telephone number.

7. The method of claim 1, wherein the selected link is a hyperlink.

8. The method of claim 1, further comprising:
   prohibiting a voice connection between the first telephone number and the second telephone number if the first telephone number rejects the proposed voice communication.

9. The method of claim 1, further comprising:
   prohibiting a voice connection between the first telephone number and the second telephone number if the second telephone number rejects the proposed voice communication.

10. A method for establishing voice communications upon initiation by a web-based user, comprising:
    receiving a first telephone number and at least one additional telephone number from a web-based user;
    verifying that the first telephone number is not on a do not call list;
    calling the first telephone number;
    presenting a menu of choices to the first telephone number, the menu of choices including a first choice to accept or reject a proposed voice communication that connects the first telephone number and the at least one additional telephone number and a second choice to edit a status associated with the first telephone number, the second choice to edit the status associated with the first telephone number including adding the first telephone number to a do not call list or removing the first telephone number from the do not call list; and
    establishing a voice connection between the first telephone number and the at least one additional telephone number if the first telephone number accepts the proposed voice communication.

11. The method of claim 10, further comprising:
    calling the at least one additional telephone number and presenting a choice to accept or reject the proposed voice communication; and
    establishing a voice connection between the first telephone number and the at least one additional telephone number if both the first telephone number and the at least one additional telephone number accept the proposed voice communication.

12. The method of claim 10, further comprising:
adding the first telephone number to the do not call list if the first telephone number rejects the proposed voice communication a first number of times.

13. The method of claim 10, further comprising:
providing a process for adding telephone numbers to the do not call list and for removing telephone numbers from the do not call list in response to a choice selection from the second choice to add the first telephone number to the do not call list or remove the first telephone number from the do not call list.

14. A method for establishing voice communications, comprising:
receiving a first telephone number from a web-based user;
initiating a call to the first telephone number;
presenting a first interactive voice menu of choices to the first telephone number, wherein the first interactive voice menu of choices includes choices to edit a status associated with the first telephone number, the choices to edit the status associated with the first telephone number including adding the first telephone number to a do not call list or removing the first telephone number from the do not call list;
receiving a choice selection from the first interactive voice menu of choices by the first telephone number; and
performing an action in response to the choice selection from the first interactive voice menu of choices.

15. The method of claim 14, wherein the first interactive voice menu of choices includes choices to accept or reject a proposed voice communication.

16. The method of claim 14, wherein the first interactive voice menu of choices includes choices related to account information, order placement, caller identification and routing, surveys, schedules, or a combination thereof.

17. The method of claim 14, further comprising adding the first telephone number to the do not call list in response to a choice selection from the first interactive voice menu of choices by the first telephone number to add the first telephone number to the do not call list.

18. The method of claim 14, further comprising removing the first telephone number from the do not call list in response to a choice selection from the first interactive voice menu of choices by the first telephone number to remove the first telephone number from the do not call list.

19. The method of claim 14, further comprising:
receiving a second telephone number;
calling the second telephone number and presenting the first interactive voice menu of choices;
establishing a voice connection between the first telephone number and the second telephone number if both the first telephone number and the second telephone number accept the proposed voice communication.

20. The method of claim 14, wherein,
if the action corresponding to the choice selection received from the first telephone number accepts a proposed voice communication, then calling a second telephone number and presenting the first interactive voice menu of choices;
receiving a choice selection from the first interactive voice menu of choices by the second telephone number; and
performing an action corresponding to the choice selection by the second telephone number.

* * * * *